United States Patent
Ohtsuka (10) Patent No.: US 9,977,358 B2
(45) Date of Patent: May 22, 2018

(54) IMAGE FORMING DEVICE (71) Applicant: Konica Minolta, Inc., Tokyo (JP)

(72) Inventor: Masaru Ohtsuka, Tachikawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days. days.

(21) Appl. No.: 15/613,643

(22) Filed: Jun. 5, 2017

(65) Prior Publication Data
US 2017/0351191 A1 Dec. 7, 2017

(30) Foreign Application Priority Data

Jun. 7, 2016 (JP) .................................. 2016-113377

(51) Int. Cl.
G03G 15/01 (2006.01)
G03G 15/00 (2006.01)
G06F 3/12 (2006.01)
H04N 1/00 (2006.01)

(52) U.S. Cl.
CPC ..... *G03G 15/0131* (2013.01); *G03G 15/0136* (2013.01); *G03G 15/652* (2013.01); *G03G 15/6529* (2013.01); *G06F 3/1253* (2013.01); *H04N 1/00087* (2013.01); *G03G 15/6564* (2013.01); *G03G 2215/00679* (2013.01)

(58) Field of Classification Search
CPC .......... G03G 15/0131; G03G 15/6529; G03G 2215/00679; G06F 3/1255; G06F 3/1253
See application file for complete search history.

(56) References Cited

U.S. PATENT DOCUMENTS

| | | | |
|---|---|---|---|
| 6,029,023 A | 2/2000 | Munemori et al. | |
| 7,365,865 B2* | 4/2008 | Kidani | H04N 1/46 347/115 |
| 7,417,770 B2* | 8/2008 | Fukao | H04N 1/60 358/2.1 |
| 7,676,171 B2* | 3/2010 | Swantner | G03G 15/01 358/1.13 |
| 2009/0232538 A1 | 9/2009 | Cook | |
| 2016/0078331 A1 | 3/2016 | Ikeda | |

FOREIGN PATENT DOCUMENTS

JP 2015212051 A 11/2015

OTHER PUBLICATIONS

Extended European Search Report dated Jan. 18, 2018, from the corresponding European Application No. 17172320.8.

* cited by examiner

Primary Examiner — Gregory H Curran
(74) Attorney, Agent, or Firm — Lucas & Mercanti, LLP (57) ABSTRACT An image forming device continuously forming an image according to a job in a conveying direction of along continuous paper includes: an image formation section forming the image according to the job on the continuous paper; an interval setting section setting a job interval of the image according to the job, which is continuously formed by the image formation section, on the basis of an operation from a user; an image forming process switching section switching two states of a state where the image formation section forms a color image and a state where the image formation section forms a monochromic image; and a switching determination section determining whether or not the two states are switched on the basis of a comparison result between the job interval set by the interval setting section and a paper conveying distance according to a switching time required for switching the two states.

11 Claims, 8 Drawing Sheets

IMAGE FORMING DEVICE

The entire disclosure of Japanese Patent Application No. 2016-113377 filed on Jun. 7, 2016 including description, claims, drawings, and abstract are incorporated herein by reference in its entirety.

BACKGROUND OF THE INVENTION

Field of the Invention

The present invention relates to an image forming device.

Description of the Related Art

In the related art, in an image forming device forming an image on a continuous paper such as a roll paper, it is proposed that whether or not to provide a white space between jobs is determined according to the mode of a first job and a second job, and thus, the wasting of paper due to the white space is reduced (for example, refer to JP 2015-212051 A).

Here, as disclosed in JP 2015-212051 A, in the image forming device forming the image on the continuous paper such as the roll paper, it is desirable that continuous printing is performed at a job interval designated by a user in order to respond to a user who wants to suppress the wasting of paper by shortening the job interval representing a distance between a final image of the job and an initial image of the next job and a user who wants to make the subsequent cutting easy by enlarging the job interval.

Further, in the image forming device described above, there is a case where a job of a color image and a job of a monochromic image are mixed, and in this case, it is desirable to switch two states of a state where the color image is formed (for example, a state where four (colors of YMCK) photoreceptors are brought into contact with an intermediate transfer belt) and a state where the monochromic image is formed (for example, a state where one (a color of K) photoreceptor is brought into contact with the intermediate transfer belt, and three (colors of YMC) photoreceptors are separated from the intermediate transfer belt). This is because in a case where the job of the monochromic image is executed, three (colors of YMC) photoreceptors not to be used are worn by the intermediate transfer belt in the case of maintaining the state where the color image is formed, and thus, the material is exhausted.

SUMMARY OF THE INVENTION

Therefore, an object of the present invention is to provide an image forming device which is capable of suitably switching a color image forming state and a monochromic image forming state in a case where a user performs continuous printing with respect to a continuous paper at a designated job interval.

To achieve the abovementioned object, according to an aspect, an image forming device continuously forming an image according to a job in a conveying direction of a long continuous paper, reflecting one aspect of the present invention comprises: an image formation section forming the image according to the job on the continuous paper; an interval setting section setting a job interval of the image according to the job, which is continuously formed by the image formation section, on the basis of an operation from a user; an image forming process switching section switching two states of a state where the image formation section forms a color image and a state where the image formation section forms a monochromic image; and a switching determination section determining whether or not the two states are switched on the basis of a comparison result between the job interval set by the interval setting section and a paper conveying distance according to a switching time required for switching the two states.

According to the image forming device of the present invention, whether or not to switch two states is determined on the basis of a comparison result between a set job interval and a paper conveying distance according to a switching time required for switching, and thus, it is possible to determine to execute the switching only in a case where the switching can be suitably performed from the comparison result, and to suitably switch a color image forming state and a monochromic image forming state in a case where a user performs continuous printing with respect to a continuous paper at a designated job interval.

According to the image forming device of the present invention, in a case where the job interval set by the interval setting section is greater than or equal to the paper conveying distance according to the switching time required for switching the two states, the switching determination section preferably determines that the two states are switched.

According to the image forming device, it is determined to execute the switching in a case where the set job interval is greater than or equal to the paper conveying distance according to the switching time required for the switching, and thus, for example, the switching is performed when the job interval is large and the switching time can be ensured, and the color image forming state and the monochromic image forming state can be suitably switched.

According to the image forming device of the present invention, the image forming device preferably further comprises: a control mode setting section setting any one from a plurality of control modes including a process switching priority mode and other control modes, on the basis of the operation from the user, wherein in a case where the process switching priority mode is set by the control mode setting section, the switching determination section preferably switches the two states regardless of the job interval set by the interval setting section.

According to the image forming device, in a case where a process switching priority mode is set on the basis of an operation from the user, two states are switched regardless of the job interval, and thus, in a case where the user wants to minimize the exhaustion of the material, a predetermined control mode is set, and therefore, it is possible to switch two states regardless of the job interval, and to improve convenience.

To achieve the abovementioned object, according to an aspect, an image forming device continuously forming an image according to a job in a conveying direction of along continuous paper, reflecting one aspect of the present invention comprises: an image formation section forming the image according to the job on the continuous paper; an interval setting section setting a job interval of the image according to the job, which is continuously formed by the image formation section, on the basis of an operation from a user; an image forming process switching section switching two states of a state where the image formation section forms a color image and a state where the image formation section forms a monochromic image; a control mode setting section setting any one from a plurality of control modes including a process switching priority mode and other control modes, on the basis of the operation from the user; and a display section displaying whether or not the job interval is required to be changed between a job of the color image and a job of the monochromic image, according to a comparison result between the job interval set by the interval setting section and a paper conveying distance according to a switching time required for switching the two states, in a case where the process switching priority mode is set by the control mode setting section, wherein in a case where the display section displays the effect that the job interval is required to be changed, the image forming process switching section changes the job interval, and then, switches the two states.

According to the image forming device of the present invention, in a case where a process switching priority mode is set, whether or not a job interval is required to be changed between a job of a color image and a job of a monochromic image is displayed according to a comparison result between the job interval and a paper conveying distance according to a switching time required for switching two states, and in a case where the effect that the job interval is required to be changed is displayed, the job interval is changed, and then, two states are switched. Thus, in a case where the job interval is narrow and the switching time for switching is not capable of being ensured in the process switching priority mode, the effect that the job interval is required to be changed is displayed, and the job interval is changed, and then, two states are switched. Accordingly, the user can recognize that job interval is changed to a job interval at which the switching time can be ensured, and thus, can suitably switch two states according to the job interval after being changed as described above.

According to the image forming device of the present invention, the display section preferably displays a setting screen on which any one of plurality of control modes including the process switching priority mode and the other control modes is set on the basis of the operation from the user, and displays the job interval required for switching the two states in a case where the process switching priority mode is set on the setting screen.

According to the image forming device, in a case where the process switching priority mode is set on a setting screen, the job interval required for switching two states is displayed, and thus, it is possible to prompt the setting of the job interval at which the change as described above is not required to be displayed.

According to the image forming device of the present invention, in a case where the process switching priority mode is set on the setting screen, the display section preferably displays of a lower limit value of the job interval required for switching the two states.

According to the image forming device, a lower limit value of the job interval required for switching two states is displayed, and thus, it is possible to prompt the setting of the job interval of greater than or equal to the lower limit value at which the change as described above is not required to be displayed.

According to the image forming device of the present invention, the image formation section preferably applies a value of the job interval set by the interval setting section between a job of the color image and a job of the monochromic image, between the jobs of the color images, and between the jobs of the monochromic images, and performs image formation of the job.

According to the image forming device, the value of the set job interval is applied between the job of the color image and the job of the monochromic image, between the jobs of the color images, and between the jobs of the monochromic images, and image formation of the job is performed. For this reason, the value of the job interval can be uniformly applied regardless of the arrangement of a color job and a monochromic job, and the user can easily recognize the setting of the job interval.

According to the image forming device of the present invention, when the process switching priority mode is set by the control mode setting section, the image formation section preferably forms an image by applying a current job interval set by the interval setting section only between a job of the color image and a job of the monochromic image, and forms an image by applying a previous job interval set before the current job interval between the jobs of the color images and between the jobs of the monochromic images.

According to the image forming device, when the process switching priority mode is set, a current job interval which is set is applied only between the job of the color image and the job of the monochromic image, and image formation is performed. In addition, a previous job interval is applied between the jobs of the color images and the jobs of the monochromic images, and image formation is performed. Thus, the job interval when two states are required to be switched can be distinguished from the job interval when two states are not required to be switched, and for example, the wasting of paper can be reduced by setting a job interval such that the switching is suitably performed in the process switching priority mode and by setting the job interval to be narrow in other control modes, and the convenience can be further improved.

According to the image forming device of the present invention, the image forming device preferably further comprises: a job completion determination section determining whether or not image formation of a next job, which becomes a next job of a current job, is completed, from a remaining distance of the continuous paper; and an adjustment section displaying a warning on the display section in a case where the job completion determination section determines that the image formation of the next job is not capable of being completed, and reducing a value of the job interval set by the interval setting section when the process switching priority mode is set by the control mode setting section.

According to the image forming device, in a case where it is determined that image formation of a next job is not capable of being completed from a remaining distance of the continuous paper, a warning is performed, and thus, it is possible for the user to recognize that the continuous paper is insufficient at the time of executing the next job. Further, when the process switching priority mode is set, the value of the job interval to be set is reduced, and thus, it is possible to narrow the job interval and to complete the image formation of the next job.

According to the image forming device of the present invention, the image forming device preferably further comprises: a job completion determination section determining whether or not image formation of all jobs which are planned to be executed after a current job is capable of being completed, from a remaining distance of the continuous paper; and an adjustment section displaying a warning on the display section in a case where the job completion determination section determines that the image formation of all of the jobs is not capable of being completed, and reducing a value of the job interval set by the interval setting section when the process switching priority mode is set by the control mode setting section.

According to the image forming device, the warning is performed in a case where it is determined that the image formation of all jobs are not capable of being completed from the remaining distance of the continuous paper, and thus, it is possible for the user to recognize that the continuous paper is insufficient at the time of executing all of the jobs to be executed. Further, when the process switching priority mode is set, the value of the job interval to be set is reduced, and thus, it is possible to narrow the job interval and to complete the image formation of the next job.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 8A and 8B are first conceptual diagrams illustrating a flow of a job to be executed, FIG. 8A illustrates a state before a change operation of a job interval, and FIG. 8B illustrates a state after the change operation of the job interval; and FIGS. 9A and 9B are second conceptual diagrams illustrating the flow of the job to be executed, FIG. 9A illustrates a state before the change operation of the job interval, and FIG. 9B illustrates a state after the change operation of the job interval is performed in a process switching priority mode.

DESCRIPTION OF THE PREFERRED EMBODIMENTS

Hereinafter, an embodiment of the present invention will be described with reference to the drawings. However, the scope of the invention is not limited to the illustrated examples.

Figure 1:
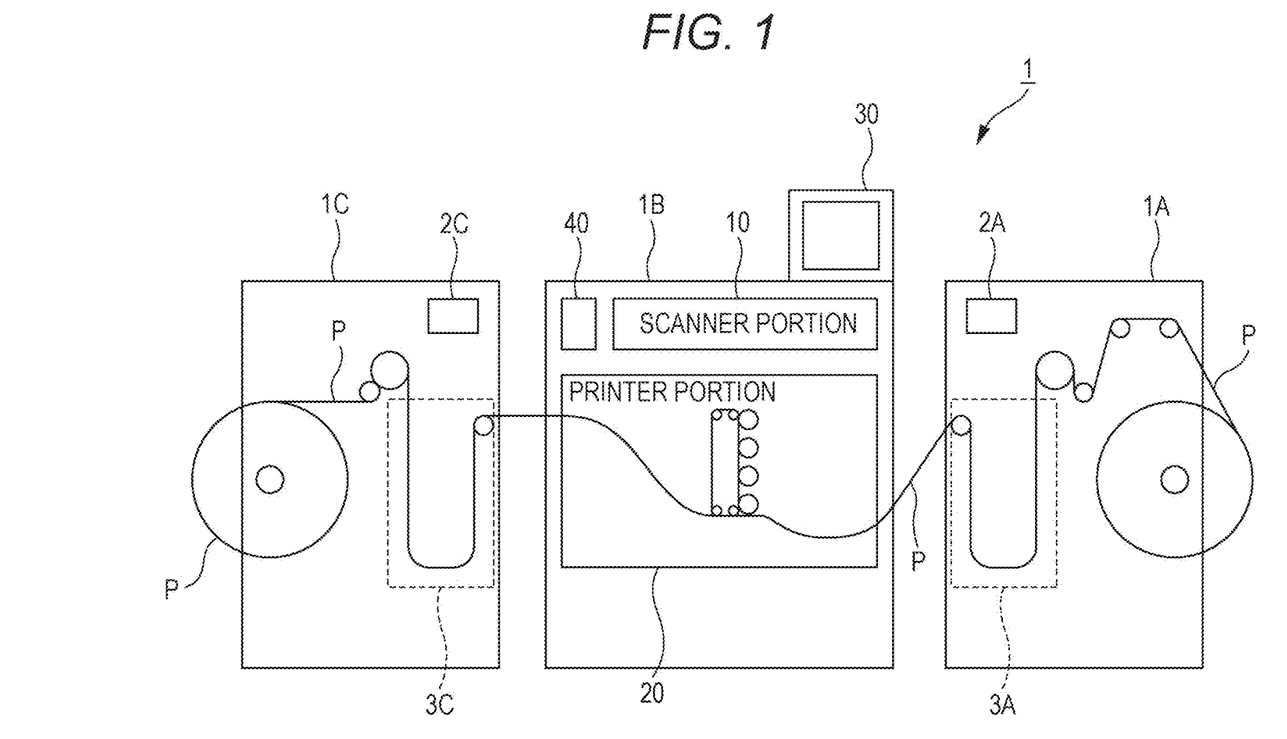
FIG. 1 is a configuration diagram schematically illustrating an image forming device according to an embodiment of the present invention.

FIG. 1 is a configuration diagram schematically illustrating an image forming device according to an embodiment of the present invention. Such an image forming device 1 includes a continuous paper supply device 1A, an image forming device main body 1B, and a continuous paper winding device 1C.

The continuous paper supply device 1A contains long continuous paper P, and supplies the continuous paper P to the image forming device main body 1B according to an instruction from the image forming device main body 1B. The continuous paper P, for example, is a roll paper wound around a shaft portion into the shape of a roll. In addition, the continuous paper P may be a so-called folded paper. Further, the continuous paper P may have perforations to be easily cut afterward. Such a continuous paper supply device 1A includes a control unit 2A controlling the supply of the continuous paper P.

The image forming device main body 1B, for example, forms an image by an electrophotographic device such as a copy machine. The image forming device main body 1B includes a scanner portion 10, a printer portion 20, an operation display unit 30, and a control unit 40.

The scanner portion 10 includes an automatic document feeding unit referred to as an auto document feeder (ADF). A document mounted on a document tray of the automatic document feeding unit is conveyed onto contact glass, which is a reading section, an image on one surface or both surfaces of the document is read by an optical system, and the image of the document is read by a charge coupled device (CCD) 11 (refer to FIG. 2).

The printer portion 20 continuously forms an image according to a job in a conveying direction of the continuous paper P, controls an LD unit (an image formation section) 21 (refer to FIG. 2) having an image forming function on the basis of image information read by the scanner portion 10 or image information transmitted from a personal computer (PC) 100 (refer to FIG. 2) or the like, and performs image formation with respect to the continuous paper P.

The operation display unit 30 is a display using both of a liquid crystal display (LCD) (a display section) 31 (refer to FIG. 2) having a display function and a touch panel having an operation function unit, and in particular, in this embodiment, an input operation of the value of a job interval representing a distance (may be a distance considering a white space or may be a distance not considering a white space) between a final image of the job and an initial image of the next job can be performed. Further, in the operation display unit 30, an operation of selecting any one from a plurality of control modes can be performed.

The control unit 40 controls the entire image forming device main body 1B, and performs various controls such as image formation or the conveyance of the continuous paper P. In addition, the control unit 40 communicates with the control unit 2A of the continuous paper supply device 1A.

The continuous paper winding device 1C winds the continuous paper P on which the image is formed in the image forming device main body 1B. In addition, the continuous paper winding device 1C includes a control unit 2C controlling the winding of the continuous paper P. The control unit 2C communicates with the control unit 40 of the image forming device main body 1B.

Further, the continuous paper supply device 1A includes a buffer unit 3A on the rear stage side. The buffer unit 3A is a function unit loosing the continuous paper P, and has a function of absorbing a speed change when a conveying speed of the continuous paper P is changed, by loosing the continuous paper P. Further, a buffer unit 3C having the same function is also provided on the front stage side of the continuous paper winding device 1C.

Figure 2:
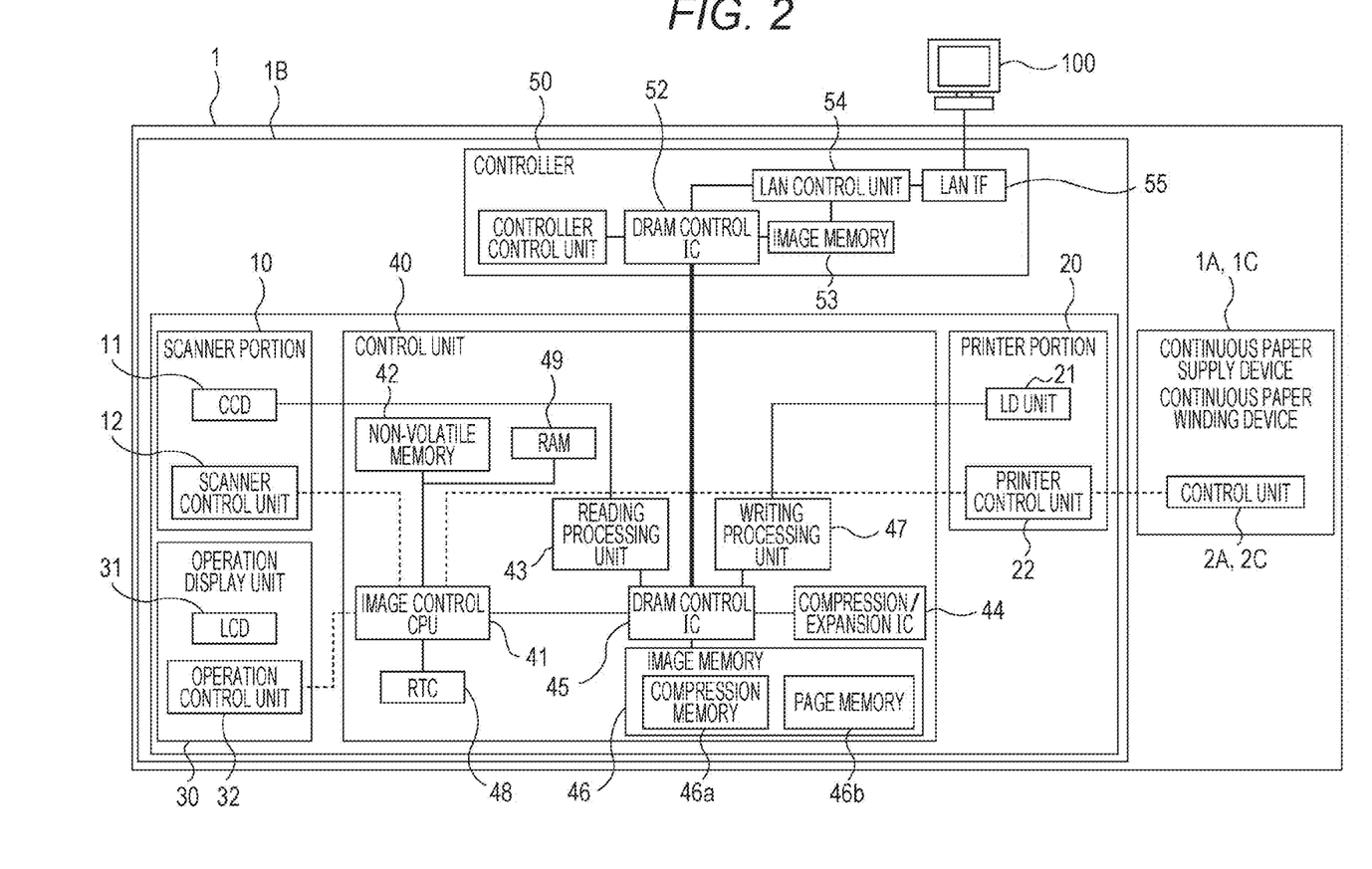
FIG. 2 is a functional block diagram of the image forming device illustrated in FIG. 1.

FIG. 2 is a functional block diagram of the image forming device 1 illustrated in FIG. 1. Furthermore, FIG. 2 illustrates the PC 100 which is capable of transmitting the image information, and illustrates the continuous paper supply device 1A and the continuous paper winding device 1C as one configuration.

As illustrated in FIG. 2, the image forming device main body 1B includes a controller 50 in addition to the configuration illustrated in FIG. 1, and includes a scanner control unit 12 in the scanner portion 10, a printer control unit (an image forming process switching section) 22 in the printer portion 20, and an operation control unit 32 in the operation display unit 30. In addition, the image forming device main body 1B has various configurations in the control unit 40.

Hereinafter, each of the units will be described in detail. The scanner control unit 12 controls the automatic document feeding unit or the like on the basis of an instruction from the control unit 40, and realizes a scanner function of reading images of a plurality of documents by the CCD 11. Analog image data read in the CCD 11 is output to a reading processing unit 43 which is provided in the control unit 40, and is subjected to A/D conversion in the reading processing unit 43, and thus, various image processings are performed.

The operation control unit 32 displays various screens, various processing results, or the like for inputting various setting conditions on the LCD 31, according to a display signal input from the control unit 40. In addition, the operation control unit 32 outputs an operation signal input from a touch panel or the like to an image control CPU 41 of the control unit 40.

The printer control unit 22 controls the operations of each unit of the printer portion 20 according to an instruction from the image control CPU 41, and performs image formation on the basis of printing image data input from a writing processing unit 47 which is provided in the control unit 40. In addition, in this embodiment, the LD unit 21 is capable of switching two states of a state where a color image is formed and a state where a monochromic image is formed, and the printer control unit 22 is capable of controlling the switching between two states. Specifically, the printer control unit 22 allows four (colors of YMCK) photoreceptors to be in contact with an intermediate transfer belt in the state where the color image is formed, and allows one (a color of K) photoreceptor to be in contact with the intermediate transfer belt and three (colors of YMC) photoreceptors to be separated from the intermediate transfer belt in the state where the monochromic image is formed.

The controller 50 manages and controls data which is input from the PC 100 connected to a network into the image forming device 1, receives the data of an image formation target from the PC 100, and transmits image data or the like which is generated by expanding the data, to the control unit 40. The controller 50 is configured of a controller control unit 51, a dynamic random access memory (DRAM) control IC 52, an image memory 53, a local area network (LAN) control unit 54, and a local area network interface (LANIF) 55.

The LAN control unit 54 controls communication with the PC 100 through the LANIF 55. The controller control unit 51 generally controls the operations of each unit of the controller 50, and generates image data in a bitmap format by expanding the data input from the PC 100 through the LANIF 55.

The DRAM control IC 52 controls the transmission of the data received by the LANIF 55 to the controller control unit 51 or the writing/reading of the image data or the like with respect to the image memory 53. In addition, the DRAM control IC 52 is connected to a DRAM control IC 45 of the control unit 40 by a peripheral components interconnect (PCI) bus, and reads the image data or the like from the image memory 53 and outputs the image data or the like to the DRAM control IC 45 of the control unit 40, according to an instruction from the controller control unit 51.

The image memory 53 is configured of a volatile memory such as a DRAM, and temporarily stores the image data or the like. The LANIF 55 is a communication interface for being connected to a network such as a LAN including a network interface card (NIC), a modem, or the like, and receives data from the PC 100. The received data is output to the image memory 53 or the DRAM control IC 52 through the LAN control unit 54.

The control unit 40 includes the image control CPU 41, a non-volatile memory 42, the reading processing unit 43, a compression/expansion IC 44, the DRAM control IC 45, an image memory 46, the writing processing unit 47, a real-time clock (RTC) 48, and a RAM 49.

The image control CPU 41 is configured of a central processing unit (CPU) or the like, reads a system program stored in the non-volatile memory 42 and a program designated from various application programs and expands the programs in the RAM 49, executes various processings in cooperation with the program expanded in the RAM 49, and performs centralized control with respect to each unit of the image forming device main body 1B.

The non-volatile memory 42 stores various processing programs, various data items, or the like relevant to image formation. The RAM 49 forms a work area temporarily storing various programs to be executed by the image control CPU 41, various data items relevant to the programs, or the like. In addition, the RAM 49 temporarily stores job data generated by the image control CPU 41, on the basis of image data input from the controller 50, image data input from the scanner portion 10, setting information set by the operation display unit 30 at the time of acquiring the image data, and the like.

The reading processing unit 43 performs various processings such as analog processing, A/D conversion processing, and shading processing with respect to analog image data input from the scanner portion 10, and generates digital image data. The generated image data is output to the compression/expansion IC 44.

The compression/expansion IC 44 performs compression processing with respect to the input digital image data, and output the compressed digital image data to the DRAM control IC 45. The DRAM control IC 45 controls compression processing of the image data and expansion processing of the compressed image data of the compression/expansion IC 44 according to the instruction from the image control CPU 41, and performs input/output control of the image data with respect to the image memory 46.

For example, in a case where a storage instruction of the image data which is read by the scanner portion 10 is input from the image control CPU 41, the DRAM control IC 45 allows the compression/expansion IC 44 to execute the compression processing of the image data which is input into the reading processing unit 43, and stores the compressed image data in a compression memory 46a of the image memory 46. In addition, in a case where the image data is input from the DRAM control IC 52 of the controller 50, the DRAM control IC 45 allows the compression/expansion IC 44 to execute compression processing of the image data, and stores the compressed image data in the compression memory 46a of the image memory 46.

Further, in a case where a print output instruction of the compressed image data which is stored in the compression memory 46a is input from the image control CPU 41, the DRAM control IC 45 reads the compressed image data from the compression memory 46a, performs the expansion processing by the compression/expansion IC 44, and stores the compressed image date in a page memory 46b. Further, in a case where the print output instruction of the image data which is stored in the page memory 46b is input, the image data is read from the page memory 46b and is output to the writing processing unit 47.

The image memory 46 includes the compression memory 46a configured of a dynamic RAM (DRAM) and the page memory 46b. The compression memory 46a is a memory for storing compressed image data, and the page memory 46b is a memory for temporarily storing image data for print output.

The writing processing unit 47 generates printing image data for image formation on the basis of the image data input from the DRAM control IC 45, and outputs the generated printing image data to the printer portion 20. The RTC 48 is a timer unit which is capable of ticking a time when a power source is turned off.

Figure 3:
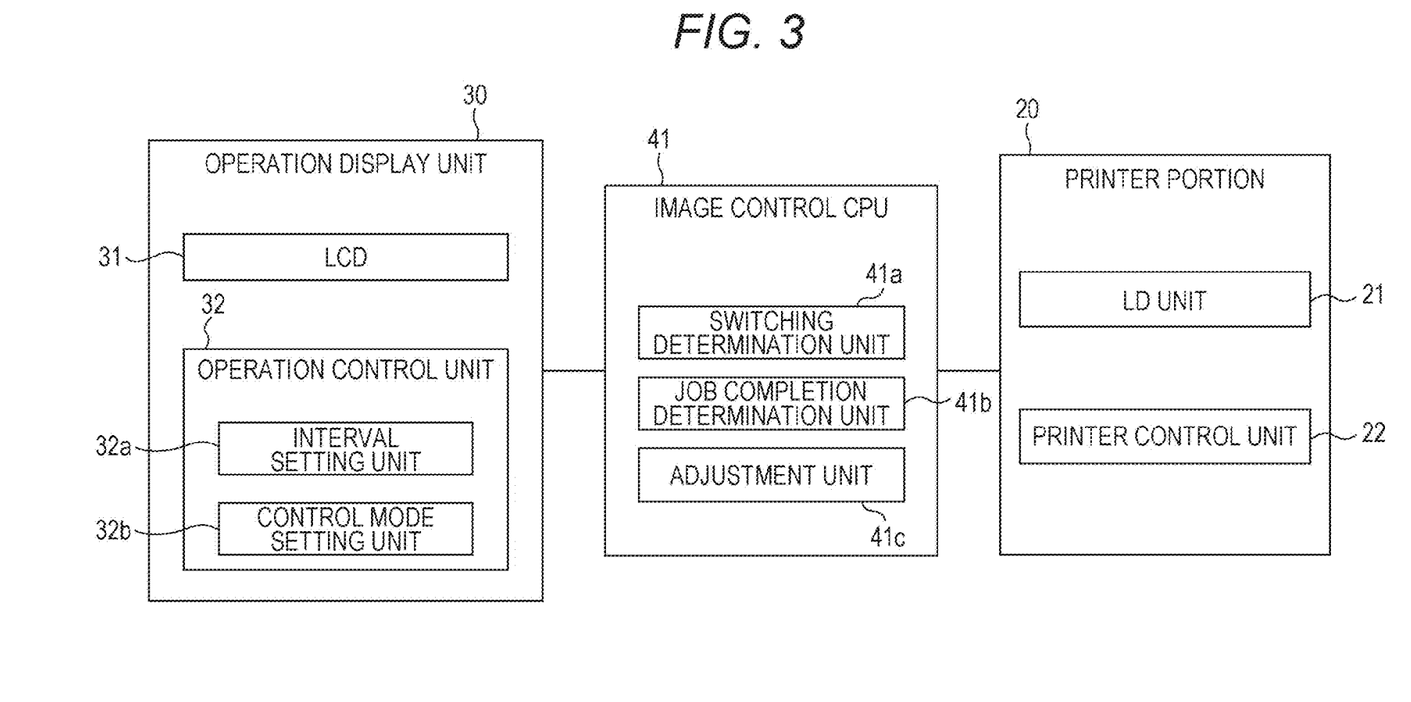
FIG. 3 is a functional block diagram illustrating a software configuration of an image forming device main body illustrated in FIGS. 1 and 2.

FIG. 3 is a functional block diagram illustrating a software configuration of the image forming device main body 1B illustrated in FIGS. 1 and 2. Furthermore, for the sake of convenience of description, FIG. 3 illustrates a configuration by excerpting apart from the configuration illustrated in FIG. 2.

As illustrated in FIG. 3, the operation display unit 30 includes an interval setting unit (an interval setting section) 32a and a control mode setting unit (a control mode setting section) 32b, as a function unit in the operation control unit 32.

Figure 4:
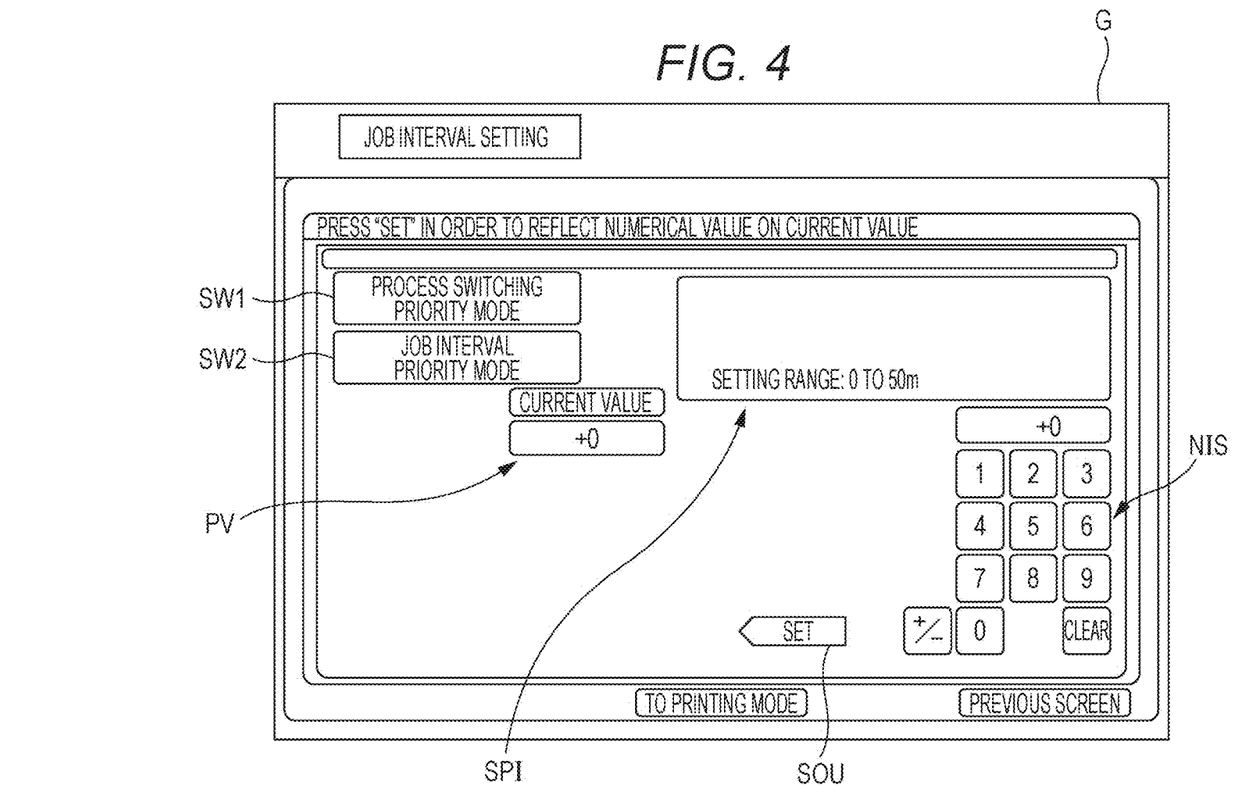
FIG. 4 is a diagram illustrating a display image which is displayed on an LCD illustrated in FIGS. 2 and 3.

FIG. 4 is a diagram illustrating a display image which is displayed on the LCD 31 illustrated in FIGS. 2 and 3. As illustrated in FIG. 4, in a case where a predetermined setting screen display operation is performed by a user, the operation display unit 30 displays a setting screen G on the LCD 31.

In the setting screen G, a selection switch SW1 for a process switching priority mode and a selection switch SW2 for a job interval priority mode (an example of other control modes) are displayed on the left side of the screen. In addition, a current value PV of the job interval is displayed adjacent to the switches SW1 and SW2. Here, the process switching priority mode is a control mode in which the LD unit 21 preferentially switches the state where the color image is formed and the state where the monochromic image is formed to maintain the job interval, and the job interval priority mode is a control mode in which the LD unit 21 preferentially maintains the job interval to switch the state where the color image is formed and the state where the monochromic image is formed.

Further, in the setting screen G, a setting operation unit SOU setting a job interval input by touching setting range information SPI representing a range of a job interval which can be set, a numerical value input unit NIS formed of a numeric keypad or the like, and a numerical value input unit NIS is displayed on the right side of the screen. In the setting range information SPI, for example, 0 m to 50 m are displayed.

In a display state of the setting screen G, in a case where the user operates the selection switch SW1, the control mode setting unit 32b determines that the process switching priority mode is selected, transmits the information of such an effect to the image control CPU 41, and sets the process switching priority mode. At this time, the image control CPU 41, for example, stores the effect that a current control mode is the process switching priority mode in the non-volatile memory 42. Accordingly, the setting of the process switching priority mode is completed. After that, the image forming device main body 1B is operated in the process switching priority mode.

Similarly, in a case where the user operates the selection switch SW2, the control mode setting unit 32b determines that the job interval priority mode is selected, transmits the information of such an effect to the image control CPU 41, and sets the job interval priority mode. At this time, the image control CPU 41, for example, stores the effect that the current control mode is the job interval priority mode in the non-volatile memory 42. Accordingly, the setting of the job interval priority mode is completed. After that, the image forming device main body 1B is operated in the job interval priority mode.

Further, in the display state of the setting screen G, in a case where the value of the job interval is input through the numerical value input unit NIS, and the setting operation unit SOU is operated, the interval setting unit 32a determines that the value of the job interval is input, transmits the information of the value to the image control CPU 41, and sets the job interval. At this time, the image control CPU 41, for example, stores the value of the job interval in the non-volatile memory 42. Accordingly, the setting of the value of the job interval is completed. After that, the image forming device main body 1B performs image formation on the basis of the stored job interval.

Refer to FIG. 3 again. As illustrated in FIG. 3, the image control CPU 41 includes a switching determination unit (a switching determination section) 41a, a job completion determination unit (a job completion determination section) 41b and an adjustment unit (an adjustment section) 41c, as a function unit.

The switching determination unit 41a determines whether or not to execute the switching between two states on the basis of a comparison result between the job interval set by the interval setting unit 32a and a paper conveying distance according to a switching time required for switching two states described above. In the case of describing by using an example, for example, the paper conveying distance according to the switching time is set to 3 m, and the job interval is set to 5 m. In this case, the job interval≥the paper conveying distance is obtained, and the switching determination unit 41a determines that the switching between two states is executed. That is, in a case where the job interval set by the interval setting unit 32a is greater than or equal to the paper conveying distance according to the switching time, the switching determination unit 41a determines that the switching between two states is executed. On the other hand, for example, the paper conveying distance according to the switching time is set to 3 m, and the job interval is set to 2 m. In this case, the job interval<the paper conveying distance is obtained, and the switching determination unit 41a determines that the switching between two states is not executed. That is, in a case where the job interval set by the interval setting unit 32a is less than the paper conveying distance according to the switching time, the switching determination unit 41a determines that the switching between two states is not executed.

Furthermore, the switching determination unit 41a executes the determination described above in the job interval priority mode. For this reason, in a case where the current control mode is in the process switching priority mode, the switching determination unit 41a determines that the switching between two states is executed regardless of the job interval set by the interval setting unit 32a.

In this case, for example, in a case where the paper conveying distance according to the switching time is 3 m, and the job interval is set to 2 m, the job interval is required to be changed. That is, in a case where the job interval is maintained as 2 m, it is not possible to ensure that the paper conveying distance according to the switching time is 3 m, and thus, the job interval is required to be changed. Accordingly, in the job interval priority mode, the LCD 31 displays whether or not the job interval is required to be changed according to the comparison result between the job interval set by the interval setting unit 32a and the paper conveying distance according to the switching time required for switching two states described above. Then, in a case where the effect that the job interval is required to be changed is displayed on the LCD 31, the printer control unit 22 changes the job interval, and then, switches two states. Here, in a case where the job interval is set to 2 m, and the paper conveying distance according to the switching time is 3 m, the printer control unit 22, for example, changes the job interval to 3 m, which is the paper conveying distance, and then, switches two states. The job interval is changed by transmitting a signal to the image control CPU 41.

Figure 5:
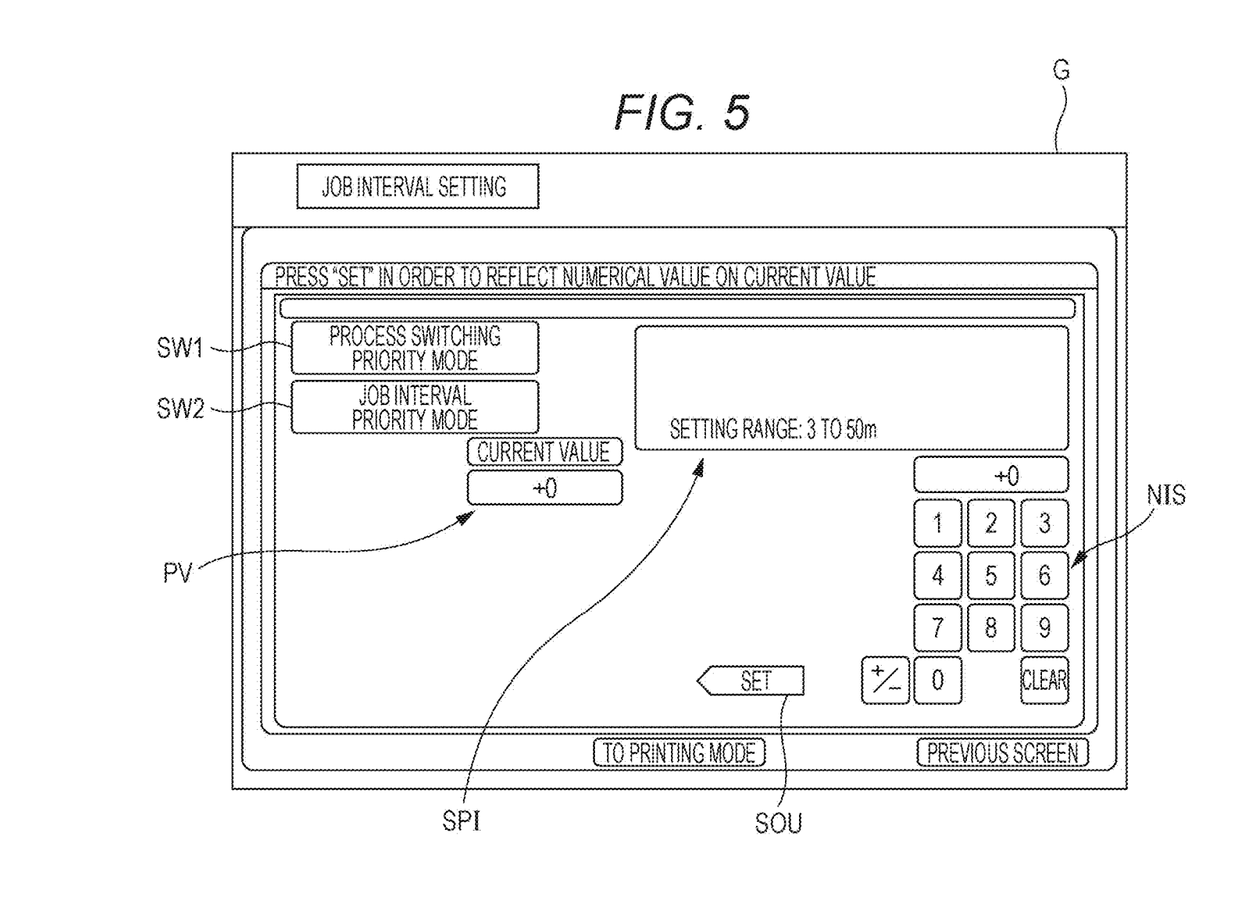
FIG. 5 is a second diagram illustrating the display image which is displayed on the LCD illustrated in FIGS. 2 and 3.

FIG. 5 is a second diagram illustrating a display image displayed on the LCD 31 illustrated in FIGS. 2 and 3. The display image illustrated in FIG. 4 is a display image when the current control mode is a job interval priority mode. In a case where the current control mode is the process switching priority mode, and the predetermined setting screen display operation is performed by the user, the operation display unit 30 displays the setting screen G as illustrated in FIG. 5 on the LCD 31.

In the setting screen G illustrated in FIG. 5, in the setting range information SPI, for example, 3 m to 50 m are displayed. That is, in a case where the process switching priority mode is set, the LCD 31 displays a job interval (in particular, a lower limit value, and in an example illustrated in FIG. 5, 3 m) required for switching two states. Accordingly, it is possible to prompt the setting of the job interval of greater than or equal to the paper conveying distance according to the switching time.

Refer to FIG. 3 again. The job completion determination unit 41b determines whether or not to complete the image formation of all jobs to be executed after the current job (jobs which have been received in the image forming device 1) or the next job from the remaining distance of the continuous paper P. Here, the image control CPU 41 manages the remaining distance of the continuous paper P whenever the job is executed. The job completion determination unit 41b calculates all of the jobs to be executed or the distance of the continuous paper P required for the next job by calculation, and determines whether or not to complete the image formation of all of the jobs to be executed or the next job by comparing with the remaining distance of the continuous paper P which is managed.

In a case where the adjustment unit 41c determines that the image formation of all of the jobs to be executed or the next job is not capable of being completed by the job completion determination unit 41b, a warning is performed with respect to the LCD 31. That is, the adjustment unit 41c performs a warning of the effect that the continuous paper P is insufficient. Further, when the control mode is set to the process switching priority mode, the adjustment unit 41c reduces the value of the job interval set by the interval setting unit 32a. For example, when it is not possible to complete the image formation of all of the jobs to be executed or the next job, and the control mode is set to the process switching priority mode, the adjustment unit 41c, for example, reduces the job interval to 3 m from 5 m. Accordingly, the control is performed in a direction where the image formation of all of the jobs or the next job is completed. Furthermore, it is preferable that the adjustment unit 41c reduces the value of the job interval in a range of greater than or equal to the paper conveying distance according to the switching time required for switching two states (that is, in a rage of greater than or equal to 3 m).

Further, the LD unit 21 described above applies the value of the job interval set by the interval setting unit 32a described above 1) between the job of the color image and the job of the monochromic image, 2) between the jobs of the color images, and 3) between the jobs of the monochromic images, and performs the image formation. However, the application is not limited thereto, and the application may be switched according to the control mode. For example, when the process switching priority mode is set, the LD unit 21 described above applies the value of the current job interval set by the interval setting unit 32a only 1) between the job of the color image and the job of the monochromic image. On the other hand, the LD unit 21 applies the value of the previous job interval set before the current job interval 2) between the jobs of the color images and 3) between the jobs of the monochromic images, and performs the image formation.

Figure 6:
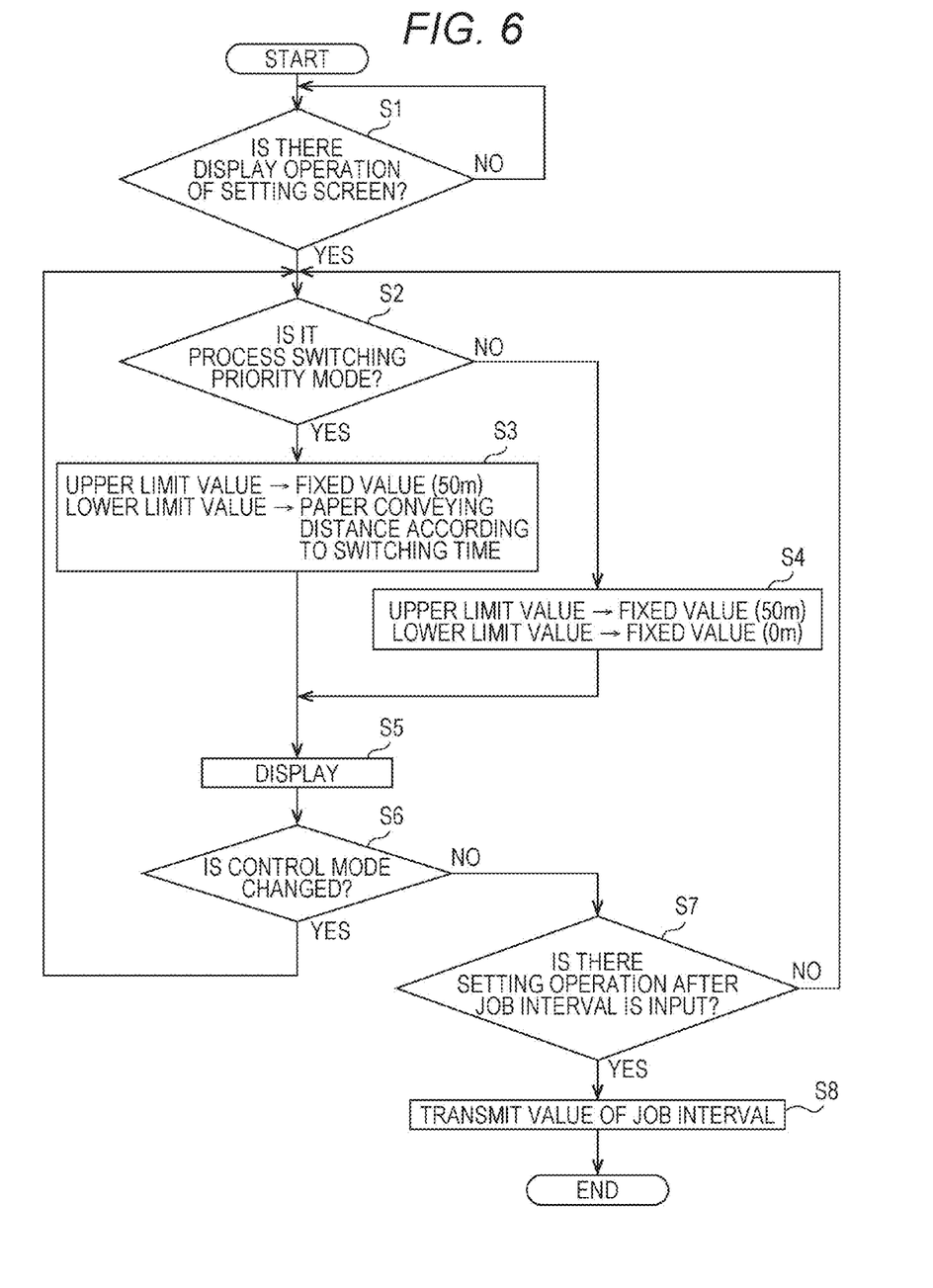
FIG. 6 is a flowchart illustrating a control method of the image forming device according to this embodiment, and illustrates processing relevant to display of a setting screen.

Next, a control method of the image forming device 1 according to this embodiment will be described. FIG. 6 is a flowchart illustrating the control method of the image forming device 1 according to this embodiment, and illustrates processing relevant to the display of the setting screen G.

As illustrated in FIG. 6, first, the image control CPU 41 determines whether or not there is the display operation of the setting screen G on the basis of the signal from the operation control unit 32 (S1). In a case where it is determined that there is no display operation of the setting screen G (S1: NO), this processing is repeated until it is determined that there is the display operation.

In contrast, in a case where it is determined that there is the display operation of the setting screen G (S1: YES), the image control CPU 41 determines whether or not the current control mode is the process switching priority mode (S2). In a case where it is determined that the current control mode is the process switching priority mode (S2: YES), the image control CPU 41 transmits data, in which an upper limit value is set to a fixed value (50 m) and a lower limit value is set to the paper conveying distance according to the switching time (3 m), to the operation control unit 32 (S3). Then, the processing proceeds to step S5.

In a case where it is determined that the current control mode is not the process switching priority mode (S2: NO), that is, in a case where that the current control mode is the job interval priority mode, the image control CPU 41 transmits data, in which the upper limit value and the lower limit value are set to fixed values (50 m and 0 m), to the operation control unit 32 (S4). Then, the processing proceeds to step S5.

In step S5, the operation control unit 32 displays the setting screen G (S5). At this time, the operation control unit 32 constructs the setting range information SPI by using the transmitted data in the step S3 or step S4, and displays the setting range information SPI on the LCD 31. Further, the operation control unit 32 displays the value of the current job interval (the current value) received from the image control CPU 41.

Next, the operation control unit 32 determines whether or not the selection switch SW1 of the process switching priority mode or the selection switch SW2 of the job interval priority mode is operated, and the control mode is changed (S6). In a case where it is determined that the control mode is changed (S6: YES), the operation control unit 32 transmits the information of such an effect to the image control CPU 41, and the processing proceeds to step S2.

In a case where it is determined that the control mode is not changed (S6: NO), the operation control unit 32 determines whether or not the value of the job interval different from the current value is input through the numerical value input unit NIS, and the setting operation unit SOU is operated (S7). In a case where it is determined that there is no operation described above (S7: NO), the processing proceeds to step S2.

In contrast, in a case where it is determined that there is the operation described above (S7: YES), the operation control unit 32 transmits the value of the input job interval (S8). Accordingly, the image control CPU 41 of the control unit 40 stores the value of the job interval in the non-volatile memory 42, and the current value is changed. After that, the processing illustrated in FIG. 6 is ended.

Figure 7:
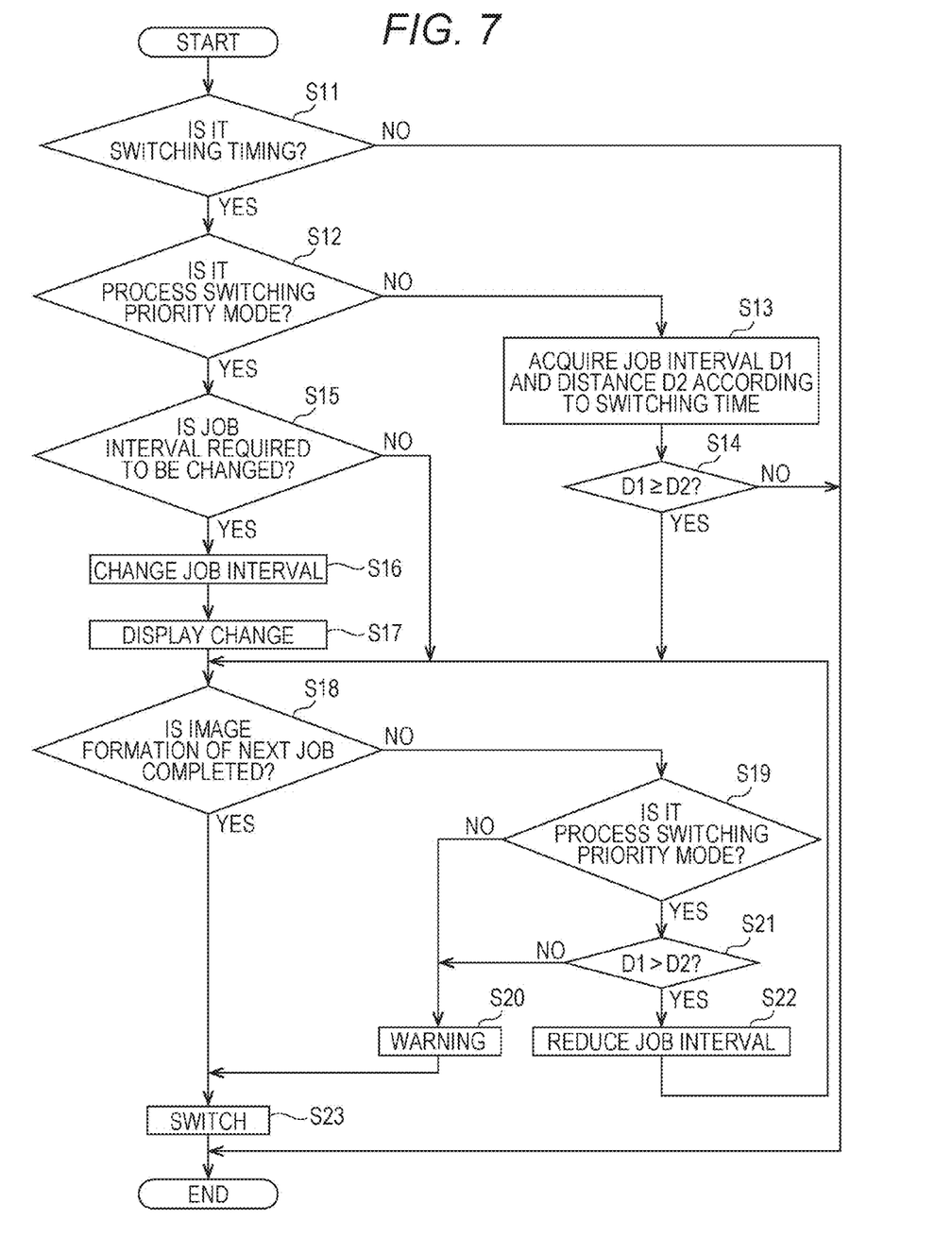
FIG. 7 is a flowchart illustrating the control method of the image forming device according to this embodiment, and illustrates processing relevant to switching between a state where a color image is formed and a state where a monochromic image is formed.

FIG. 7 is a flowchart illustrating the control method of the image forming device 1 according to this embodiment, and illustrates processing relevant to the switching between the state where the color image is formed and the state where the monochromic image is formed.

As illustrated in FIG. 7, first, the image control CPU 41 determines whether or not to switch the state where the color image is formed and the state where the monochromic image is formed (S11). Specifically, the image control CPU 41, for example, determines whether or not the switching is required such that the current job forms the color image or the next job forms the monochromic image, determines whether or not the current time point is immediately before the current job is ended (for example, when the number of remaining image formations is a predetermined number), and determines whether or not it is switching timing.

In a case where it is determined that it is not the switching timing (S11: NO), the processing illustrated in FIG. 7 is ended. In contrast, in a case where it is determined that it is the switching timing (S11: YES), it is determined whether or not the current control mode is the process switching priority mode (S12).

In a case where it is determined that the current control mode is not the process switching priority mode (S12: NO), that is, in a case where it is determined that the current control mode is the job interval priority mode, the switching determination unit 41a of the image control CPU 41 acquires information of a current value D1 of the job interval and the paper conveying distance D2 according to the switching time required for switching two states (S13).

Then, the switching determination unit 41a determines whether or not the current value D1 of the job interval≥the paper conveying distance D2 according to the switching time is obtained (S14). In a case where it is determined that the current value D1 of the job interval≥the paper conveying distance D2 according to the switching time is not obtained (S14: NO), the processing illustrated in FIG. 7 is ended. That is, the current value D1 of the job interval is small and the paper conveying distance D2 is not capable of being ensured, and thus, in the job interval priority mode, the processing illustrated in FIG. 7 is ended without switching two states.

In a case where it is determined that the current value D1 of the job interval≥the paper conveying distance D2 according to the switching time is obtained (S14: YES), the processing proceeds to step S18.

However, in a case where it is determined that the current control mode is the process switching priority mode (S12: YES), the image control CPU 41 determines whether or not the job interval is required to be changed (S15). At this time, as with step S14, the image control CPU 41 determines whether or not the current value D1 of the job interval≥the paper conveying distance D2 according to the switching time is obtained, and when the current value D1 of the job interval≥the paper conveying distance D2 according to the switching time is obtained, it is determined that the job interval is not required to be changed (S15: NO). In contrast, when the current value D1 of the job interval≥the paper conveying distance D2 according to the switching time is not obtained, it is determined that the job interval is required to be changed (S15: YES).

In a case where it is determined that the job interval is required to be changed (S15: YES), the image control CPU 41 changes the job interval (S16), and displays the effect that the job interval is changed through the operation control unit 32 (S17). At this time, the job interval, for example, is changed to be greater than or equal to the paper conveying distance D2. Then, the processing proceeds to step S18.

In contrast, in a case where it is determined that the job interval is not required to be changed (S15: NO), the processing proceeds to step S18 without changing the job interval or displaying such an effect.

In step S18, the job completion determination unit 41b determines whether or not to complete the image formation of the next job on the basis of the remaining distance of the continuous paper P (S18). Furthermore, in step S18, the "next job" may be "all of the jobs to be executed".

In a case where it is determined that the image formation of the next job is capable of being completed (S18: YES), the processing proceeds to step S23.

In a case where it is determined that the image formation of the next job is not capable of being completed (S18: NO), the image control CPU 41 determines whether or not the current control mode is the process switching priority mode (S19). In a case where it is determined that the current control mode is not the process switching priority mode (S19: NO), that is, in a case where it is determined that the current control mode is the job interval priority mode, the image control CPU 41 displays a warning through the operation control unit 32 (S20), and the processing proceeds to step S23.

In a case where it is determined that the current control mode is the process switching priority mode (S19: YES), the adjustment unit 41c determines whether or not the current value D1 of the job interval>the paper conveying distance D2 according to the switching time is obtained (S21). In a case where it is determined that the current value D1>the paper conveying distance D2 is obtained (S21: YES), the adjustment unit 41c reduces the current value D1 of the job interval (S22), and the processing proceeds to step S18.

In contrast, in a case where it is determined that the current value D1>the paper conveying distance D2 is not obtained (S21: NO), the processing proceeds to step S20, a warning is displayed (S20), and then, the processing proceeds to step S23.

In step S23, the printer control unit 22 switches two states (S23). Then, the processing illustrated in FIG. 7 is ended.

Figure 8A:
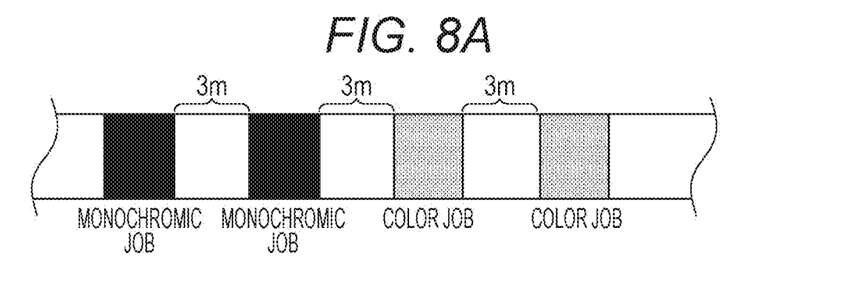
Figure 8B:
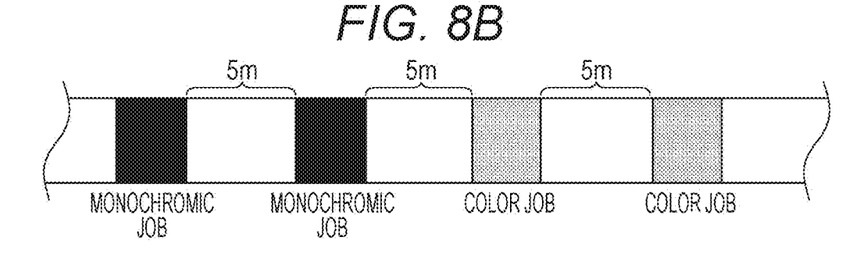

FIGS. 8A and 8B are first conceptual diagrams illustrating the flow of the job to be executed, FIG. 8A illustrates a state before a change operation of the job interval, and FIG. 8B illustrates a state after the change operation of the job interval. As illustrated in FIG. 8A, the job interval, for example, is set to 3 m. For this reason, the job interval is 3 m 1) between the job of the color image and the job of the monochromic image, 2) between the jobs of the color images, and 3) between the jobs of the monochromic images.

Here, an operation of changing the job interval to 5 m is performed. In this case, as illustrated in FIG. 8B, the job interval is changed to 5 m 1) between the job of the color image and the job of the monochromic image, 2) between the jobs of the color images, and 3) between the jobs of the monochromic images.

Figure 9A:
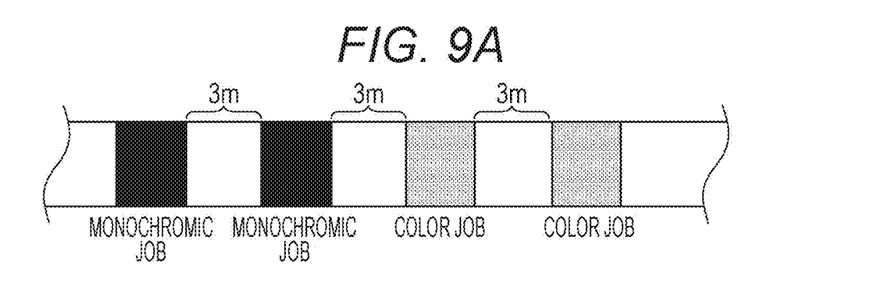
Figure 9B:
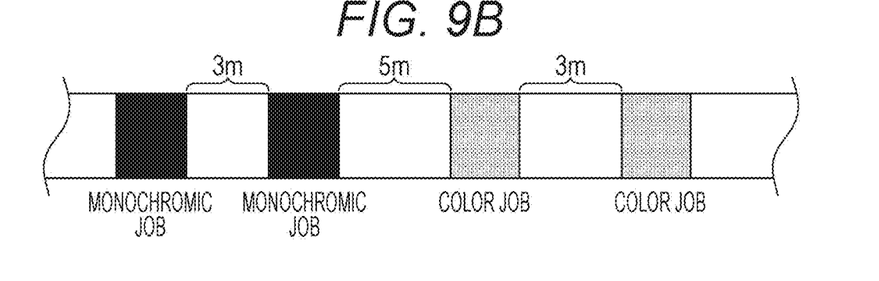

FIGS. 9A and 9B are second conceptual diagrams illustrating the flow of the job to be executed, FIG. 9A illustrates a state before the change operation of the job interval, and FIG. 9B illustrates a state after the change operation of the job interval is performed in the process switching priority mode. The job interval is not limited to the case of being changed as illustrated in FIGS. 8A and 8B, and may be as illustrated in FIGS. 9A and 9B.

First, FIG. 9A is identical to FIG. 8A. Here, an operation of changing the job interval to 5 m is performed at the time of the process switching priority mode. In this case, as illustrated in FIG. 9B, the value of the current job interval after being changed (5 m) is applied only 1) between the job of the color image and the job of the monochromic image. On the other hand, the value of the previous job interval before being changed (3 m) is applied 2) between the jobs of the color images and 3) between the jobs of the monochromic images.

Furthermore, in a case where the operation of changing job interval to 5 m is performed at the time of the job interval priority mode but not the process switching priority mode, as illustrated in FIGS. 8A and 8B, the value of the current job interval (5 m) is applied between all of the jobs.

Thus, according to the image forming device 1 of this embodiment, it is determined whether or not to execute the switching between two states on the basis of the comparison result between the set job interval and the paper conveying distance according to the switching time required for the switching, and thus, it is possible to execute the switching only in a case where the switching can be suitably performed from the comparison result, and in a case where the user performs continuous printing with respect to the continuous paper at a designated job interval, a color image forming state and a monochromic image forming state can be suitably switched.

In addition, in a case where the set job interval is greater than or equal to the paper conveying distance according to the switching time required for the switching, it is determined to execute the switching, and thus, for example, the switching is performed when the job interval is large and the switching time can be ensured, and therefore, the color image forming state and the monochromic image forming state can be suitably switched.

In addition, in a case where the process switching priority mode is set on the basis of the operation from the user, the switching between two states is executed regardless of the job interval, and thus, in a case where the user plans to minimize the exhaustion of the material, the predetermined control mode is set, and therefore, it is possible to execute the switching between two states regardless of the job interval, and to improve the convenience.

In addition, in a case where the process switching priority mode is set, whether or not the job interval is required to be changed between the job of the color image and the job of the monochromic image is displayed according to the comparison result between the job interval and the paper conveying distance according to the switching time required for the switching between two states, and in a case where the effect that the job interval is required to be changed is displayed, the job interval is changed, and then, two states are switched. Thus, in the process switching priority mode, in a case where the job interval is narrow and the switching time required for the switching is not capable of being ensured, the effect that the job interval is required to be changed is displayed, the job interval is changed, and then, two states are switched. Accordingly, the user can recognize that the job interval is changed to a job interval at which the switching time can be ensured, and two states can be suitably switched by the job interval after being changed.

In addition, in a case where the process switching priority mode is set on the setting screen G, the job interval required for switching two states is displayed, and thus, it is possible to prompt the setting of the job interval in which the change as described above is not required to be displayed.

In addition, the lower limit value of the job interval required for switching two states is displayed, and thus, it is possible to prompt the setting of the job interval of greater than or equal to the lower limit value in which the change as described above is not required to be displayed.

In addition, the value of the set job interval is applied between the job of the color image and the job of the monochromic image, between the jobs of the color images, and between the jobs of the monochromic images, and the image formation of the job is performed. For this reason, the value of the job interval can be uniformly applied regardless of the arrangement of a color job and a monochromic job, and the user can easily recognize the setting of the job interval.

In addition, when the process switching priority mode is set, the set current job interval is applied only between the job of the color image and the job of the monochromic image, and the image formation is performed. In addition, the previous job interval is applied between the jobs of the color images and between the jobs of the monochromic images, and the image formation is performed. Thus, the job interval when two states are required to be switched can be distinguished from the job interval when two states are not required to be switched, and for example, the wasting of paper can be reduced by setting a job interval such that the switching is suitably performed in the process switching priority mode and by setting the job interval to be narrow in other control modes, and the convenience can be further improved.

In addition, in a case where it is determined that the image formation of the next job is not capable of being completed from the remaining distance of the continuous paper P, a warning is performed, and thus, it is possible for the user to recognize that the continuous paper P is insufficient at the time of executing the next job. Further, when the process switching priority mode is set, the value of the job interval to be set is reduced, and thus, it is possible to narrow the job interval and to complete the image formation of the next job.

In addition, the warning is performed in a case where it is determined that the image formation of all of the jobs is not capable of being completed from the remaining distance of the continuous paper P, and thus, it is possible for the user to recognize that the continuous paper P is insufficient at the time of executing all of the jobs to be executed. Further, when the process switching priority mode is set, the value of the job interval to be set is reduced, and thus, it is possible to narrow the job interval and to complete the image formation of the next job.

As described above, the image forming device of the present invention has been described on the basis of the embodiment, but the present invention is not limited thereto, and a change may be added within a range not departing from the gist of the present invention, and if possible, technologies described in each embodiment may be combined or technologies of the related art and the like may be combined.

For example, in the above description, an example has been described in which the paper conveying distance D2 according to the switching time is 3 m, but the paper conveying distance is not limited thereto, and may be other values. In particular, the paper conveying distance D2 according to the switching time may be a value which can be changed by adjusting a paper conveying speed.

Further, the paper conveying distance D2 according to the switching time may be a different value between a case where the switching proceeds to the monochromic image forming state from the color image forming state and a case where the switching proceeds to the color image forming state from the monochromic image forming state.

Further, in the embodiment described above, the image forming device 1 has been described as a system formed of the image forming device main body 1B, the continuous paper supply device 1A, and the continuous paper winding device 1C, but is not limited thereto, and the image forming device 1 may indicate only the image forming device main body 1B.

Although the present invention has been described and illustrated in detail, it is clearly understood that the same is by way of illustrated and example only and is not to be taken byway of limitation, the scope of the present invention being interpreted by terms of the appended claims.

What is claimed is:

1. An image forming device continuously forming an image according to a job in a conveying direction of a long continuous paper, comprising:
   an image formation section forming the image according to the job on the continuous paper;
   an interval setting section setting a job interval of the image according to the job, which is continuously formed by the image formation section, on the basis of an operation from a user;
   an image forming process switching section switching two states of a state where the image formation section forms a color image and a state where the image formation section forms a monochromic image; and
   a switching determination section determining whether or not the two states are switched on the basis of a comparison result between the job interval set by the interval setting section and a paper conveying distance according to a switching time required for switching the two states.

2. The image forming device according to claim 1, wherein in a case where the job interval set by the interval setting section is greater than or equal to the paper conveying distance according to the switching time required for switching the two states, the switching determination section determines that the two states are switched.

3. The image forming device according to claim 1, further comprising:
   a control mode setting section setting any one from a plurality of control modes including a process switching priority mode and other control modes, on the basis of the operation from the user,
   wherein in a case where the process switching priority mode is set by the control mode setting section, the switching determination section switches the two states regardless of the job interval set by the interval setting section.

4. An image forming device continuously forming an image according to a job in a conveying direction of a long continuous paper, comprising:
   an image formation section forming the image according to the job on the continuous paper;
   an interval setting section setting a job interval of the image according to the job, which is continuously formed by the image formation section, on the basis of an operation from a user;
   an image forming process switching section switching two states of a state where the image formation section forms a color image and a state where the image formation section forms a monochromic image;
   a control mode setting section setting any one from a plurality of control modes including a process switching priority mode and other control modes, on the basis of the operation from the user; and
   a display section displaying whether or not the job interval is required to be changed between a job of the color image and a job of the monochromic image, according to a comparison result between the job interval set by the interval setting section and a paper conveying distance according to a switching time required for switching the two states, in a case where the process switching priority mode is set by the control mode setting section,
   wherein in a case where the display section displays the effect that the job interval is required to be changed, the image forming process switching section changes the job interval, and then, switches the two states.

5. The image forming device according to claim 4, wherein the display section displays a setting screen on which any one of plurality of control modes including the process switching priority mode and the other control modes is set on the basis of the operation from the user, and displays the job interval required for switching the two states in a case where the process switching priority mode is set on the setting screen.

6. The image forming device according to claim 5, wherein in a case where the process switching priority mode is set on the setting screen, the display section displays of a lower limit value of the job interval required for switching the two states.

7. The image forming device according to claim 1, wherein the image formation section applies a value of the job interval set by the interval setting section between a job of the color image and a job of the monochromic image, between the jobs of the color images, and between the jobs of the monochromic images, and performs image formation of the job.

8. The image forming device according to claim 3, wherein when the process switching priority mode is set by the control mode setting section, the image formation section forms an image by applying a current job interval set by the interval setting section only between a job of the color image and a job of the monochromic image, and forms an image by applying a previous job interval set before the current job interval between the jobs of the color images and between the jobs of the monochromic images.

9. The image forming device according to claim 4, further comprising:
   a job completion determination section determining whether or not image formation of a next job, which becomes a next job of a current job, is completed, from a remaining distance of the continuous paper; and
   an adjustment section displaying a warning on the display section in a case where the job completion determination section determines that the image formation of the next job is not capable of being completed, and reducing a value of the job interval set by the interval setting section when the process switching priority mode is set by the control mode setting section.

10. The image forming device according to claim 4, further comprising:
a job completion determination section determining whether or not image formation of all jobs which are planned to be executed after a current job is capable of being completed, from a remaining distance of the continuous paper; and
an adjustment section displaying a warning on the display section in a case where the job completion determination section determines that the image formation of all of the jobs is not capable of being completed, and reducing a value of the job interval set by the interval setting section when the process switching priority mode is set by the control mode setting section.

11. The image forming device according to claim 4, wherein the image formation section applies a value of the job interval set by the interval setting section between a job of the color image and a job of the monochromic image, between the jobs of the color images, and between the jobs of the monochromic images, and performs image formation of the job.

* * * * *